(12) United States Patent
Li et al.

(10) Patent No.: US 6,915,486 B2
(45) Date of Patent: Jul. 5, 2005

(54) CUSTOMIZING A GRAPHICAL USER INTERFACE OF A HOST APPLICATION

(75) Inventors: Yongcheng Li, Raleigh, NC (US); Yih-Shin Tan, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 582 days.

(21) Appl. No.: 09/782,774

(22) Filed: Feb. 13, 2001

(65) Prior Publication Data

US 2002/0109717 A1 Aug. 15, 2002

(51) Int. Cl.[7] ............................................... G06F 3/00
(52) U.S. Cl. ..................... 715/765; 715/744; 715/746
(58) Field of Search ................................ 715/513, 733, 715/738, 744, 746, 760, 762, 764, 765, 866; 345/744, 746, 764, 765, 763, 762; 707/513

(56) References Cited

U.S. PATENT DOCUMENTS

| | | | |
|---|---|---|---|
| 6,178,433 B1 * | 1/2001 | Nakamura et al. | 707/513 |
| 6,345,278 B1 * | 2/2002 | Hitchcock et al. | 707/100 |
| 6,429,882 B1 * | 8/2002 | Abdelnur et al. | 345/763 |
| 6,476,828 B1 * | 11/2002 | Burkett et al. | 345/760 |
| 6,496,202 B1 * | 12/2002 | Prinzing | 345/762 |
| 6,678,738 B2 * | 1/2004 | Haverstock et al. | 709/246 |
| 2003/0063119 A1 * | 4/2003 | Bloomfield et al. | 345/738 |

* cited by examiner

Primary Examiner—X. L. Bautista
(74) Attorney, Agent, or Firm—Yee & Associates P.C.

(57) ABSTRACT

A method in a data processing system for customizing a graphical user interface of an application on a data processing system is provided. A first customization format is determined. A second customization format is determined. Then customization of the graphical user interface is initiated by automatically switching between the first customization format and the second customization format.

35 Claims, 8 Drawing Sheets

CUSTOMIZING A GRAPHICAL USER INTERFACE OF A HOST APPLICATION

BACKGROUND OF THE INVENTION

1. Field of the Invention

The present invention relates to an improved data processing system. More particularly, the present invention provides customizing a graphical user interface of a host application. Still more particularly, the present invention provides customizing a graphical user interface of a host application in a continuous running mode via dynamic switching with heterogeneous business logic flows.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." A browser is a program that is executed on a graphical user interface (GUI) in a client computer. The browser allows a user to seamlessly load documents from a server via the Internet and display them by means of the GUI. These documents are commonly formatted using markup language protocols, such as hypertext markup language (HTML).

The client and the web server typically communicate using hypertext transport protocol (HTTP). However, when a client is accessing sensitive information from a web server, a secure protocol may be used. Hypertext transport protocol secure is the protocol for accessing a secure Web server. Using HTTPS in the uniform resource locator (URL) instead of HTTP directs the message to a secure port number rather than a default Web port. The session is then managed by a security protocol. Secure sockets layer is the leading security protocol on the Internet. When a session is started in SSL, the browser sends its public key to the server so that the server can securely send a secret key to the browser. The browser and server exchange data via secret key encryption during that session.

However, HTTP is a stateless protocol. Therefore, every request from an HTTP client to an HTTP server is a new request and no state is maintained between requests. Conventionally, HTTP cookies are used to maintain a client-side state whereas sessions are used to manage the state information on the server side. A cookie is data created by a web server that is stored on a client computer. A cookie is used to keep track of a user's patterns and preferences and, with the cooperation of the Web browser, is stored within the client computer. Cookies contain a range of URLs for which they are valid. When the browser encounters those URLs again, it sends the appropriate cookies to the Web server.

A session is used to track the activities of a user. For example, a session may be created to allow a user to add items to a "shopping cart" using a plurality of individual requests. A session may also allow a user to use a web interface to search a database. Web interfaces may also be used to control equipment from remote locations. As web interfaces become increasingly popular, the security of sessions used to manage multiple transactions by individual clients becomes exceedingly important. Normally, a session is created on the server side. To associate a session with a user, a random number, referred to as a session identification (ID), is generated and associated with the user. The session ID is sent back to the browser as a cookie or through a URL rewriting mechanism.

An important concept of conducting electronic business (e-business) is to extend the reach of legacy applications to the Internet. Host applications may be customized in an effort to make the host application appear like web applications so that a user who has an Internet connection may access these host applications.

A host application may be customized screen by screen. With this approach, there is a default customization for each host screen. The user may provide further customization by selecting an individual host screen and modify the host screen's graphical user interface (GUI). An advantage of this approach is that the user can present the entire host application to the web very quickly while customizing portions of the host applications selectively and gradually. A disadvantage of this approach is that the user has to recognize all of the customized host screens which make the screen recognition difficult and inefficient. Another problem with this approach is that the customization is screen-based and does not perform like a web application.

Another approach is to use a macro script to automatically drive the host application. The macro script prompts the user for inputs and, in response, extracts host data from host application screens. The extracted host data can then be presented to the user for interaction. Developing the macro-based customization is simple. Screen recognition becomes easy and efficient because a user only needs to distinguish a few host screens. Additionally, it is relatively easy to construct a fully web-like host application using the macro-based customization method since the web page construction is based on extracted data instead of host application screens. However, the problem with current macro-based host application customization techniques is that the user has to record a macro that covers every screen of the host application. Consequently, it is difficult for a user to customize part of the host application but provide the whole host application to a customer.

Furthermore, there are hybrid approaches utilizing the screen by screen approach and the macro-based approach. Some hybrid approaches allow users to skip intermediate screens. However, these hybrid approaches do not change the screen-by-screen customization requirement and provide little support to combine data from multiple screens. Other hybrid approaches may use a macro-based host application customization but they do not provide for automatic switching between screen-by-screen customization and macro-based customization or displaying individual customized screens. Therefore, it would be advantageous to have an improved method for partial customization of host applications using macro-based and individual screen customization techniques.

SUMMARY OF THE INVENTION

The present invention provides a method in a data processing system for customizing a graphical user interface of an application on a data processing system. A first customization format is determined. A second customization format is determined. Then customization of the graphical user interface is initiated by automatically switching between the first customization format and the second customization format.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
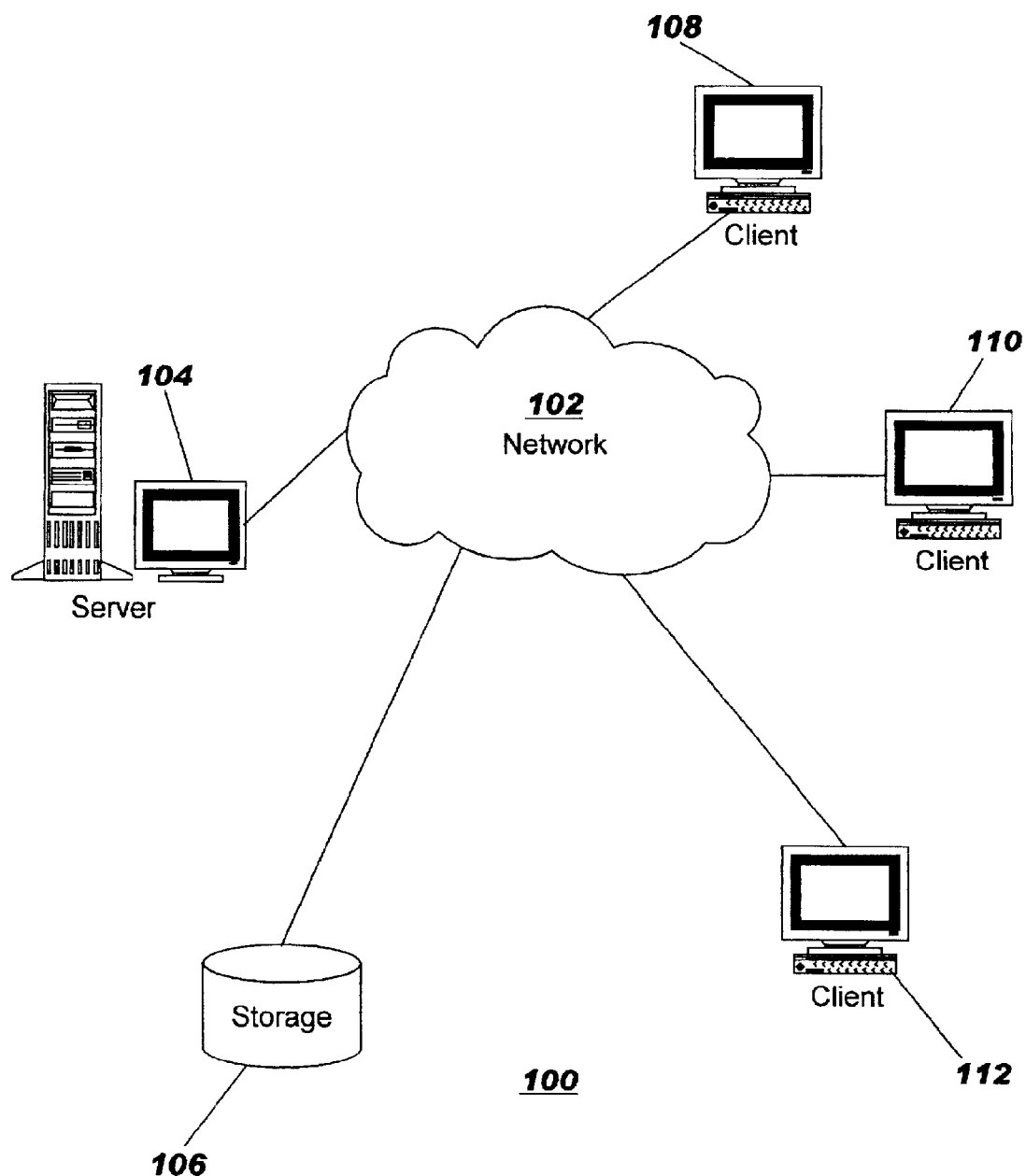
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
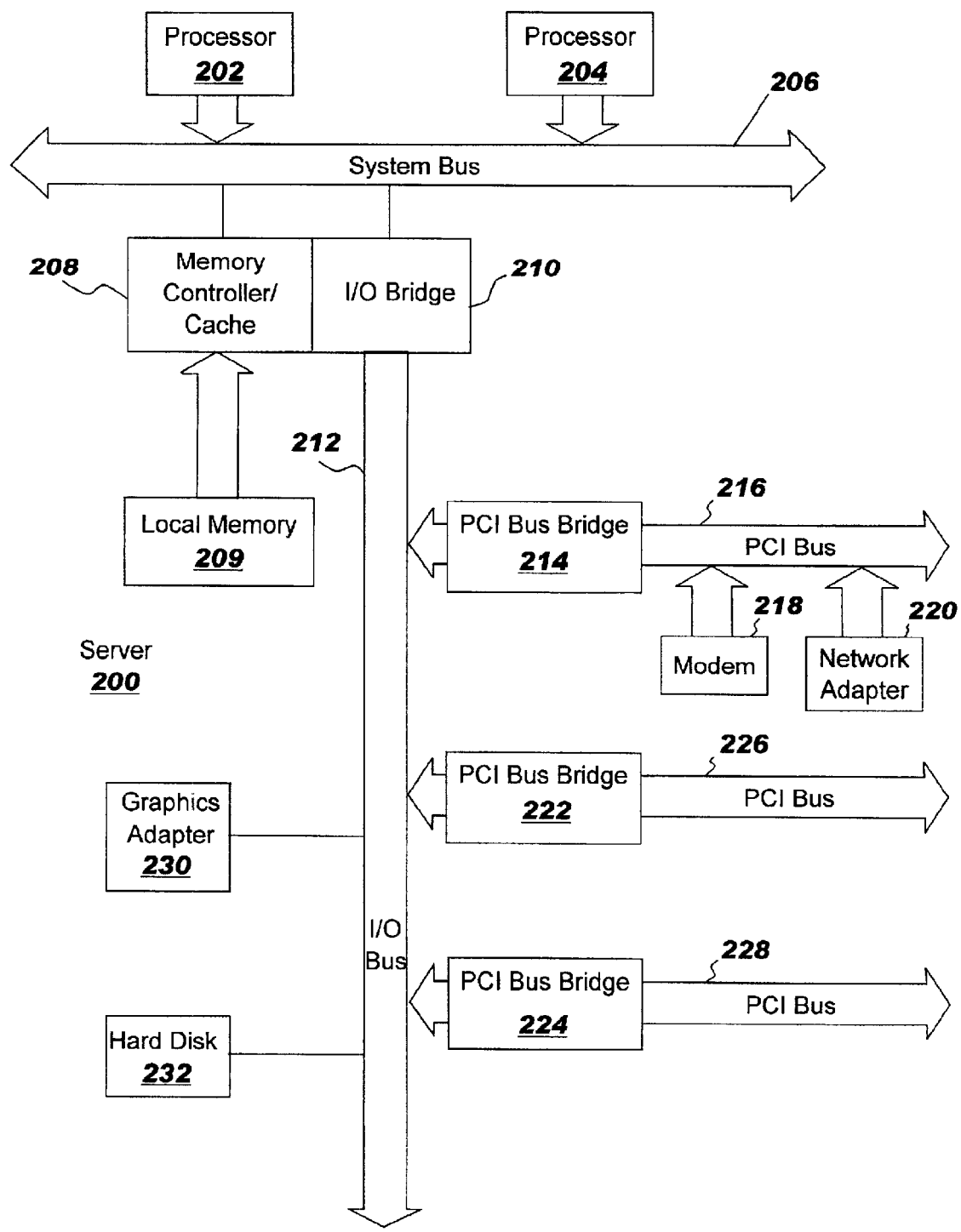
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
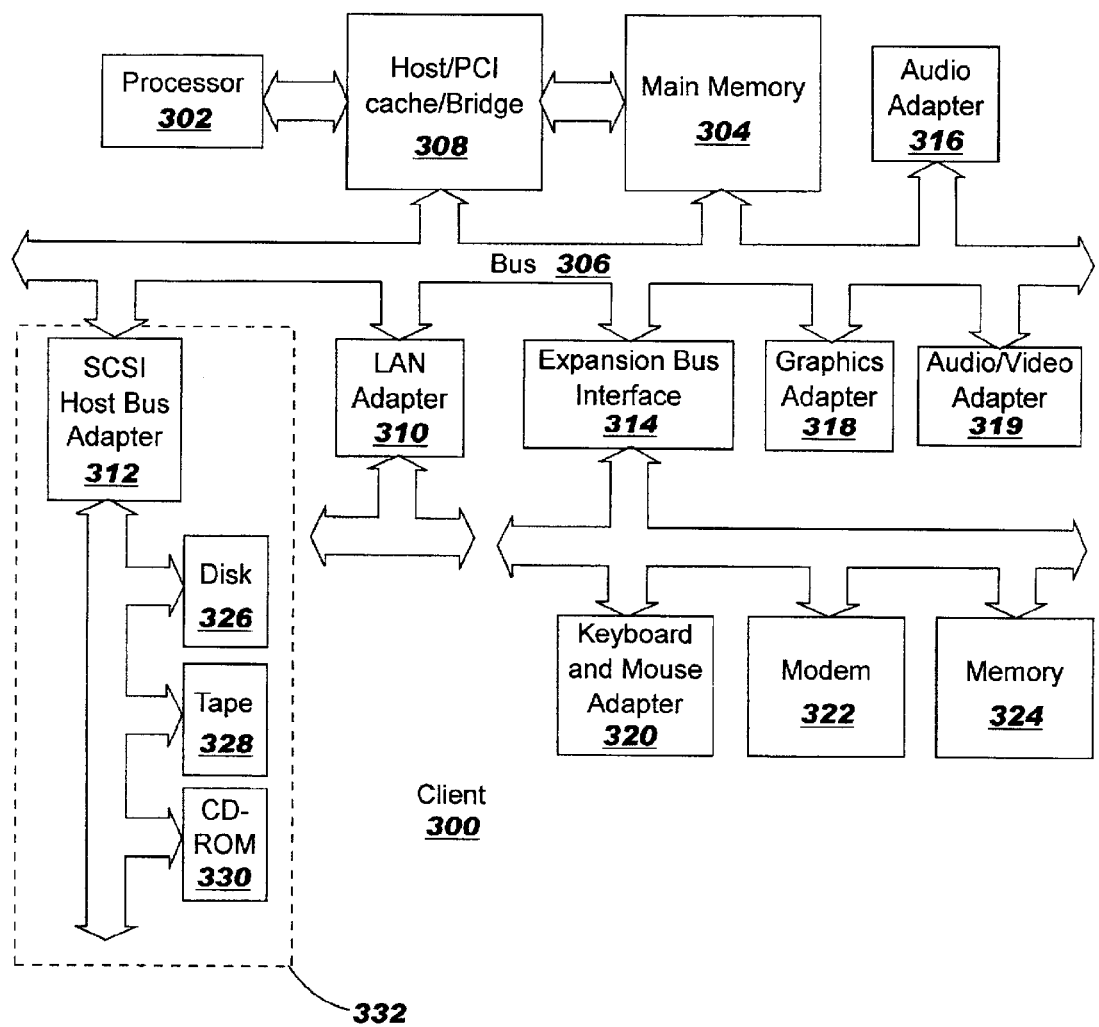
FIG. 3 is a block diagram illustrating a data processing system that may be implemented as a client in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method for a mixed approach which allows a user to do a partial customization of a host application using macro-based and individual screen customization. This method also provides default customization of host applications for a host screen which may not be covered by the macro-based approach. The present invention allows a user to selectively customize some parts of the host applications using a user friendly macro-based approach and yet the user is also able to present the whole application to a customer. The customization process may be done in a gradual fashion. This customization process combines the strength of both the macro-based approach and screen by screen based approach.

Figure 4:
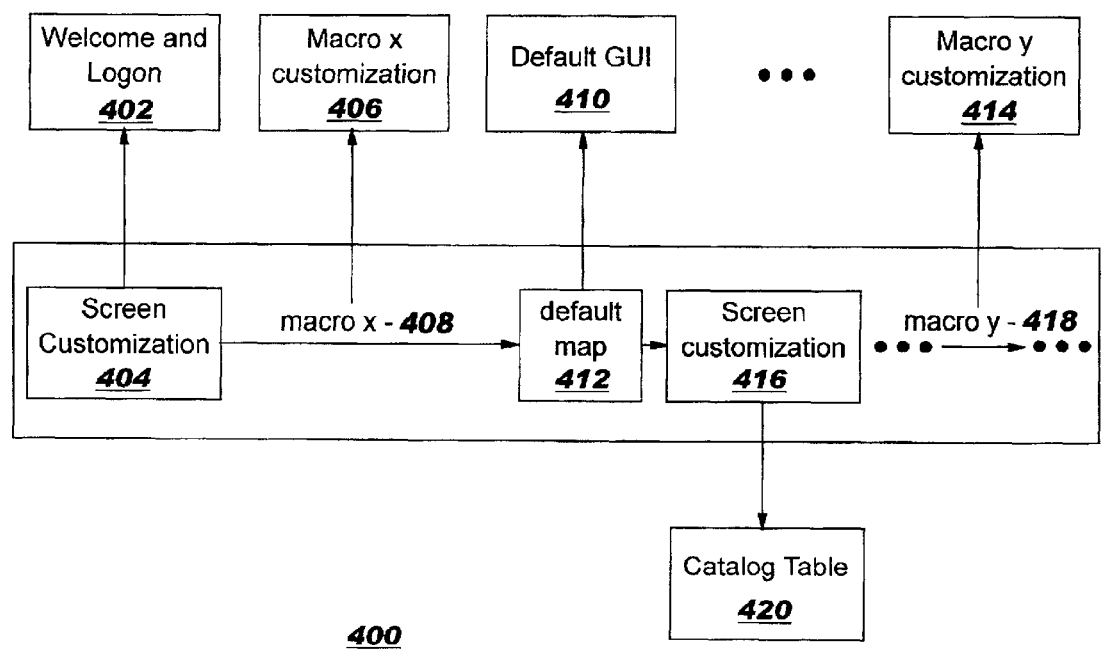
FIG. 4 is a block diagram illustrating the presentation flow of customized host interface in accordance with a preferred embodiment of the present invention.

FIG. 4 is a block diagram illustrating the presentation flow of customized host interface in accordance with a preferred embodiment of the present invention. A web page for a host application may be designed in several ways, for example, by creating a list of specific tasks invoking macros to return host information, apply a default customization of host screens, apply individual customization of host screens, and a mixture of invoking macros, default customization and individual customization of host screens. An administrator may specify a list of macros to use for the customized host application and when to switch among macros. At runtime, an execution engine may automatically start and track execution of the macros and automatically switch between the macro customization mode and the screen by screen customization mode. In the macro customization mode, the user session is executing a macro from an associated macro list and the macro may control the customization of the encountered host application screens. In the screen customization mode, no macro may be active. If no macro is active, the user session may display an individually customized or default host application screen one by one.

In this example, host application screens will flow through a series of customization logic 404, 408, 412, 416, and 418. A user session is initialized with an individual screen customization logic 404 thereby initiating welcome and logon screen 402. Macro "x" 408 may be automatically or manually selected from a list of controlling macros based on the user input from the customized welcome screen 402 returned to the screen customization logic 404. Next, macro "x" 408 is executed and therefore this execution controls macro "x" customization 406. When macro "x" is complete and no specific customization is required for the host application screen at that time, default map 412 may be used thereby producing default GUI 410 to modify the host application screen. A user may select customized screen 416 presenting catalog table 420 which is further used to navigate to the next point controlled by a macro. When this process is complete, macro "y" 418 may be executed and therefore the execution of macro "y" 418 controls macro "y" customization 414 and the process may be repeated.

Figure 5:
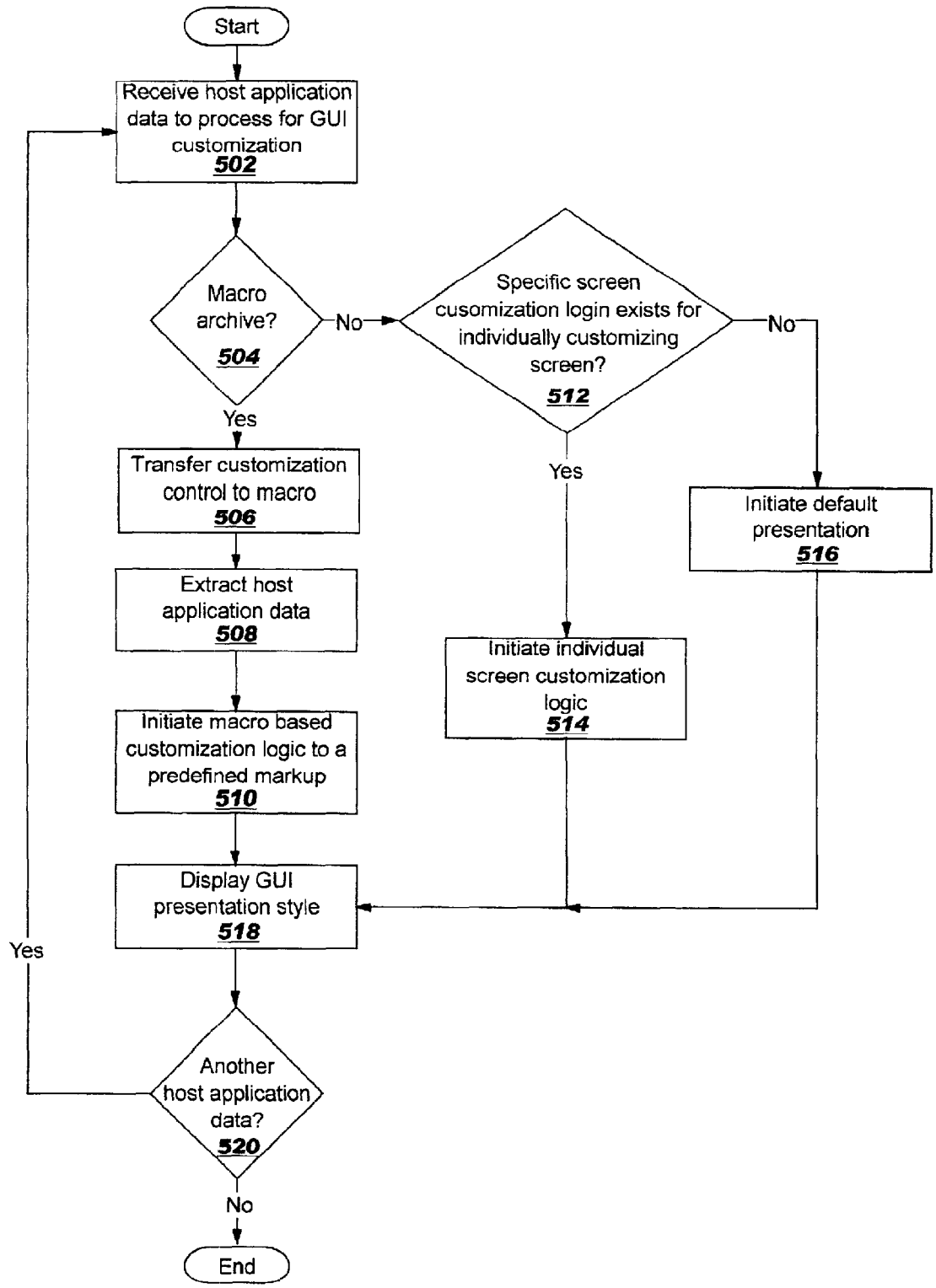
FIG. 5 is an exemplary flowchart illustrating the main customization of a host interface control flow in accordance with a preferred embodiment of the present invention.

FIG. 5 is an exemplary flowchart illustrating the main customization of a host interface control flow in accordance with a preferred embodiment of the present invention. In this example, the operation starts by receiving host application data to process for GUI customization (step 502). Then a determination is made as to whether or not a macro is active (step 504). If a macro is not active (step 502:NO), a determination is made as to whether or not specific screen customization login exists for individually customizing a screen (step 512). If specific screen customization does login does not exist for individually customizing a screen (step 512:NO), then default presentation is initiated (step 516). The GUI presentation style is displayed (step 518). Then a determination is made as to whether or not another host application data is available (step 520). If another host application data is available (step 520:YES), then the process returns to step 502 in which host application data to process for GUI customization is received. If another host application data is not available (step 520:NO), the operation terminates.

Returning to step 512, if a specific screen customization exists for individually customizing a screen (step 512:YES), then individual screen customization logic is initiated (step 514). The GUI presentation style is displayed (step 518). Then a determination is made as to whether or not another host application data is available (step 520). If another host application data is available (step 520:YES), then the process returns to step 502 in which host application data to process for GUI customization is received. If another host application data is not available (step 520:NO), the operation terminates.

Returning to step 504, if a macro is active (step 504:YES), customization control is transferred to the macro (step 506). Host application data is then extracted (step 508). Then macro based customization logic is initiated to a predefined markup (step 510). The GUI presentation style is displayed (step 518). Then a determination is made as to whether or not another host application data is available (step 520). If another host application data is available (step 520:YES), then the process returns to step 502 in which host application data to process for GUI customization is received. If another host application data is not available (step 520:NO), the operation terminates.

Figure 6:
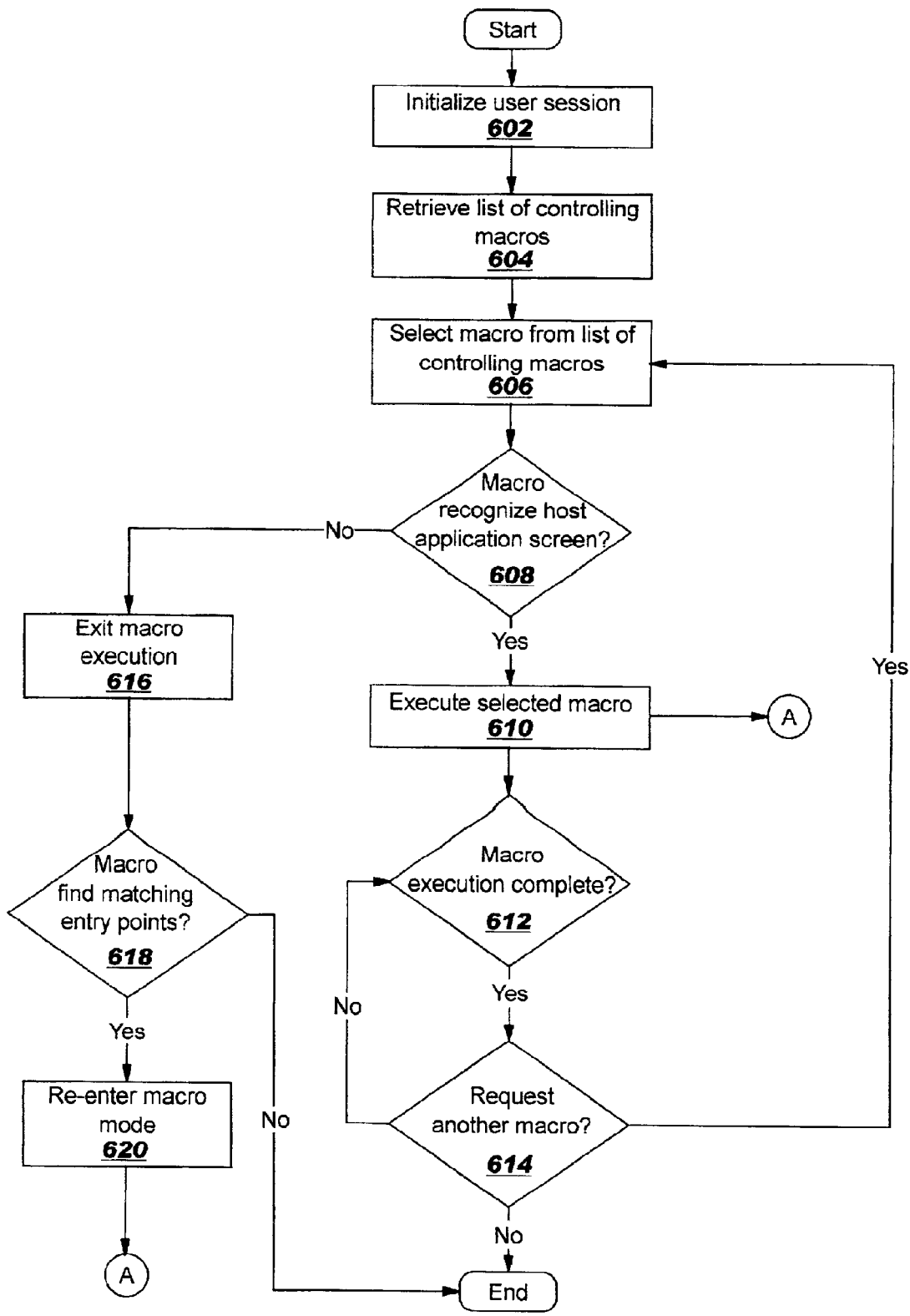
FIG. 6 is an exemplary flowchart illustrating the main macro processing in accordance with a preferred embodiment of the present invention.

FIG. 6 is an exemplary flowchart illustrating the main macro processing in accordance with a preferred embodiment of the present invention. In this example, the operation starts when a user session is initialized (step 602). A list of controlling macros is then retrieved (step 604). A selection of a macro is made from the list of controlling macros (step 606). Then a determination is made as to whether or not the macro recognizes the host application screen (step 608). If the macro does recognize the host application screen (step 608:YES), the selected macro is executed (step 610). Then a determination is made as to whether or not the macro execution is complete (step 612). If the macro execution is not complete (step 612:NO), the operation returns to step 610 in which the selected macro is executed. If the macro execution is complete (step 612:YES), then a determination is made as to whether or not another macro has been requested (step 614). If another macro has not been requested (step 614:NO), the operation terminates. If another macro has been requested (step 614:YES), the operation returns to step 606 in which a macro is selected from the list of controlling macros.

Returning to step 608, if the macro does not recognize the host application screen (step 608:NO), the macro execution is exited (step 616). Then a determination is made as to whether or not the macro finds any matching entry points (step 618). If the macro does not find any matching entry points (step 618:NO), the operation terminates. If the macro does find any matching entry points (step 618:YES), the macro mode is re-entered (step 620) and thereafter the operation returns to step 610 in which the selected macro is executed.

Figure 7:
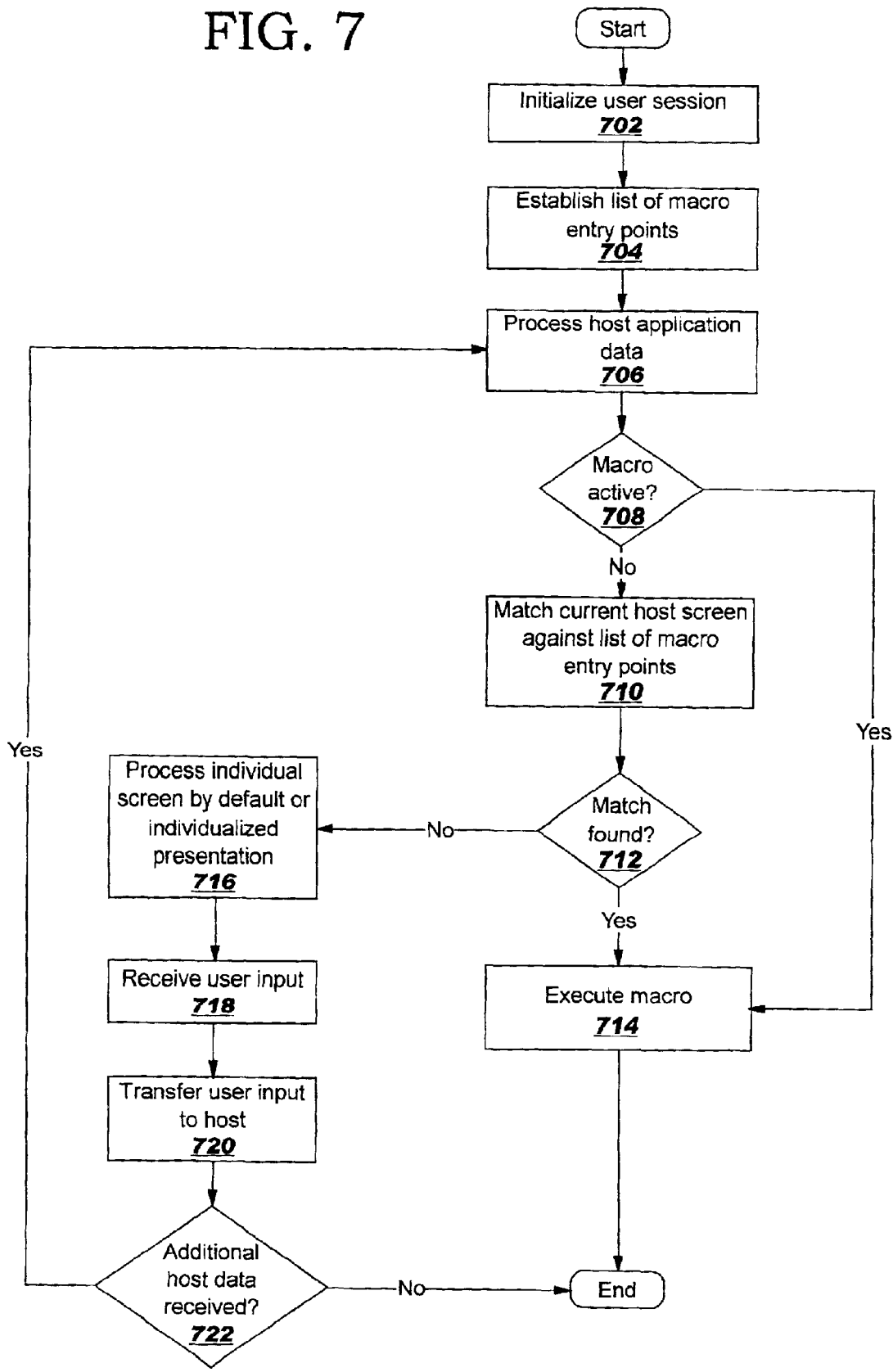
FIG. 7 is an exemplary flowchart illustrating the macro re-entry processing in accordance with a preferred embodiment of the present invention.

FIG. 7 is an exemplary flowchart illustrating the macro re-entry processing in accordance with a preferred embodiment of the present invention. In this example, the operation starts with the initialization of a session (step 702). The a list of macro entry points is established (step 704). Host application data is then processed (step 706). A macro script describes a sequence of interaction with the host application. An interaction is carried out against a particular host screen. A macro entry point is the host screen of any interaction in the sequence that is identified for entry purpose, such as the first interaction in the sequence. All the macro entry points from the associated macro list for this session form the list of macro entry points. The re-entry operation starts when the individual host application data screen is processed without an macro being active.

A determination is then made as to whether or not a macro is active (step 708). If a macro is active (step 708:YES), the operation executes the macro (step 714) and thereafter the operation terminates. If a macro is not active (step 708:NO), a current host screen is matched against a list of macro entry points (step 710). Then a determination is made as to whether or not a match is found (step 712). If a match is found (step 712:YES), the macro is executed (step 714) and then the operation terminates. If a match is not found (step 712:NO), an individual screen is processed by default or individualized presentation (step 716). User input is then received (step 718). The user input is then transferred to the host (step 720). Then a determination is made as to whether or not additional host data is to be received (step 722). If additional host data is to be received (step 722:YES), the operation returns to step 706 in which the host application data is processed. If additional host data is not to be received (step 722:NO), then the operation terminates.

Figure 8:
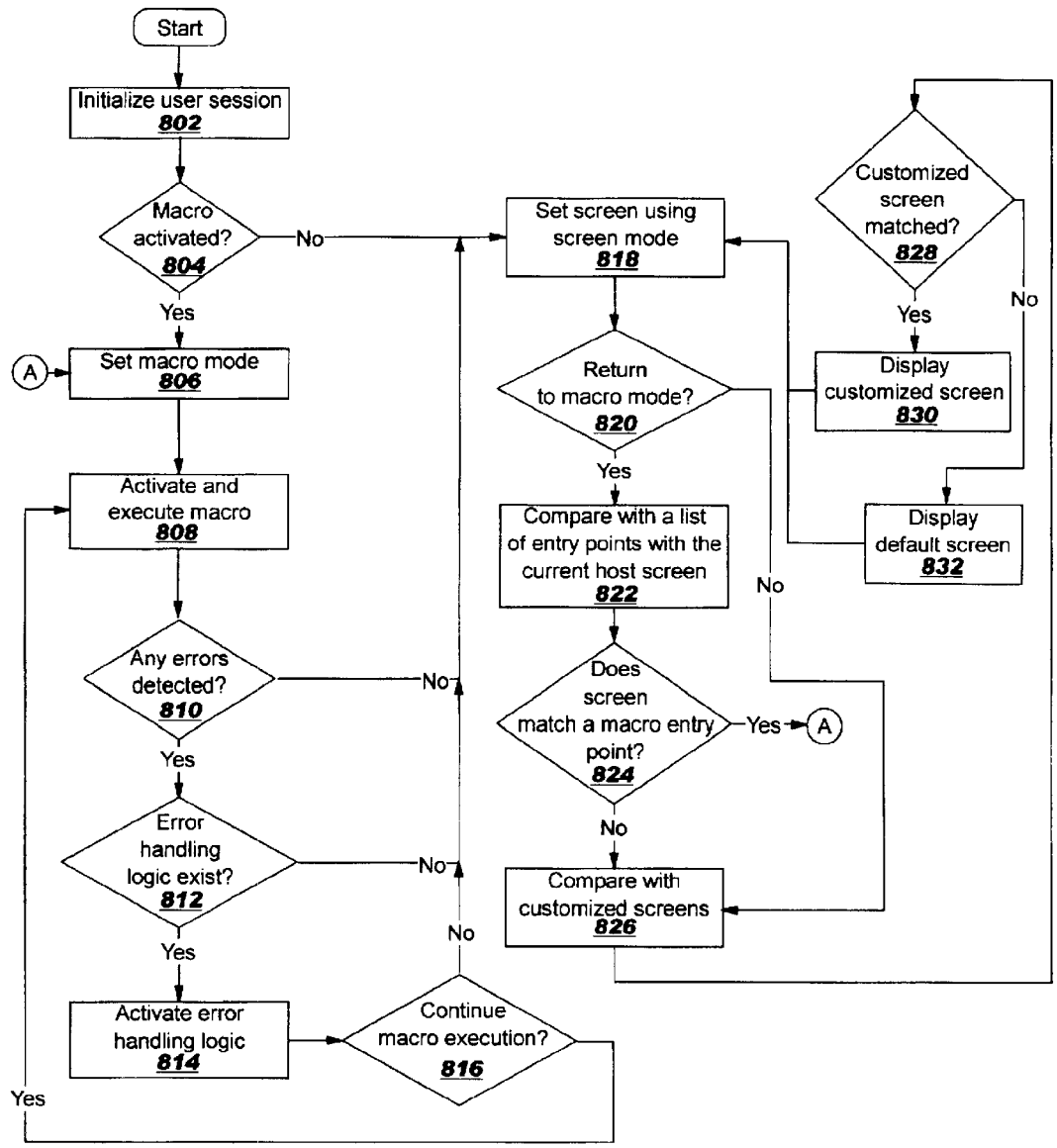
FIG. 8 is an exemplary flowchart illustrating customization of a host interface in accordance with a preferred embodiment of the present invention, considering all three aspects of customization and macro error cases.

FIG. 8 is an exemplary flowchart illustrating customization of a host interface in accordance with a preferred embodiment of the present invention, considering all three aspects of customization and macro error cases. In this example, the operation starts by initializing a user session (step 802). Then a determination is made as to whether or not a customization macro is activated (step 804). If a customization macro is not activated (step 804:NO), then a screen is set using the screen customization mode (step 818). If a customization macro is activated (step 804:YES), the macro customization mode is set (step 806). Then the customization macro is activated and executed (step 808). The macro may control the customization by feeding data extracted from host screens to an automated customization logic according to a predefined markup. Then a determination is made as to whether or not any errors have been detected (step 810). A macro specifies an expected interaction sequence with the host application. A macro starts from an entry point and continues its interaction based on the macro script. The macro script describes what action to perform on the current host screen and what are the next possible host screens it will receive within a specified timeframe. An error may occur when the macro does not receive the host screen it expects within the specified timeframe. When this happens, the macro does not know how to proceed and may ask the user for error handling logic. If no errors have been detected (step 810:NO), then this indicates a normal completion of the macro mode and the next screen is set using the screen customization mode (step 818). If an error is detected (step 810:YES), then a determination is made as to whether or not error handling logic exists (step 812). If error handling logic does not exist (step 812:NO), then a screen is set using the screen customization mode (step 818). If error handling logic does exist (step 812:YES), then the error handling logic is activated (step 814) which may attempt to repair the error and determine whether the macro execution should continue. When an error occurs during the operation of a macro, for example, the macro did not receive its expected screen, the macro may first determine if error handling logic is provided. If the macro developer provides an error handling logic, the operation may continue using the error handling logic. If no special error handling logic is provided, the operation may switch to the screen customization mode because the default screen may always be displayed. Then a determination is made as to whether or not the macro should continue to execute (step 816). If the macro is to continue to execute (step 816:YES), then the operation returns to macro execution (step 808). If the macro is not to continue to execute (step 816:NO), the operation returns to step 818 in which the macro is terminated and the current unknown screen is set using the screen customization mode.

Returning to step 818 in which a screen is set using the screen customization mode, a determination is then made as to whether or not there should be a return to macro customization mode (step 820). A return to macro customization mode may be from an automatic macro activation setting or a previous macro execution ended in error. If a return to the macro customization mode is not to be carried out (step 820:NO), then the operation proceeds to individual screen customization (step 825). If a return to the macro customization mode is to be carried out (step 820:YES), a list of macro entry points are compared with the current host screen (step 822). Then a determination is made as to whether or not the screen matches a macro entry point (step 824). If the screen matches a macro entry point (step 824:YES), the operation returns to step 806 in which a macro customization mode is set and the macro will be activated at the entry point. If the screen does not match any macro entry point (step 824:NO), then the operation initiates into individual screen customization processing (step 825). The screen is then compared to a list of customized screens (step 826). Then a determination is made as to whether or not a customized screen is matched (step 828). If no customized screen is matched (step 828:NO), then a default display screen is displayed (step 830) and thereafter the operation returns to step 818 to continue the screen customization mode. If a customized screen is matched (step 828:YES), the customized screen is displayed (step 830) and thereafter the operation also returns to step 818 to continue the screen customization mode. This method may continues iteratively and may automatically switch between macro and screen modes to customize host application data until the user session is terminated.

Therefore, the present invention provides a method for partial customization of host applications using macro-based and individual screen customization techniques. The present invention provides a method for a mixed approach which allows a user to do a partial customization of a host application using macro-based and individual screen customization. This method also provides default customization of host applications for a host screen which may not be covered by the macro-based approach. The present invention allows a user to selectively customize some parts of the host applications using a user friendly macro-based approach and yet the user is also able to present the whole application to a customer. The customization process may be done in a gradual fashion. This customization process combines the strength of both the macro-based approach and screen by screen based approach.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for customizing a web-based graphical user interface for an application on a data processing system, wherein the application generates a plurality of screens of display and wherein the plurality of screens of display of the application are not web-based, the method comprising:

initiating customization of the web-based graphical user interface using a first customization format based on the plurality of screens of display; and responsive to a given event during customization, automatically switching from the first customization format to a second customization format, wherein the first customization format and the second customization format maintain continuous interaction with the application.

2. The method in claim 1, wherein the first customization format is a macro-based customization format.

3. The method of claim 2, wherein initiating customization of the graphical user interface is sent to a predefined markup.

4. The method in claim 1, wherein the second customization format is a screen by screen customization format.

5. The method of claim 1, further comprising: responsive to completion of customization of the graphical user interface, displaying the graphical user interface based on the customization.

6. The method on claim 1, wherein if a first format and a second format cannot be determined, initiating customization of the graphical user interface by automatically switching to a default customization format.

7. A method in a data processing system for customizing a graphical user interface of a host application, comprising a plurality of screens, on a data processing system, the method comprising:

retrieving a customization format from a plurality of customization formats;

determining if the retrieved customization format recognizes a host application screen among the plurality of host application screens; and responsive to the retrieved customization format recognizing the host application screen, executing the retrieved customization format to customize the graphical user interface.

8. The method of claim 7, wherein the customization format is at least one of a macro-based customization format and screen by screen customization format.

9. The method of claim 7, further comprising: responsive to the retrieved customization format not recognizing the host application screen, exiting the retrieved customization format;

matching the retrieved customization format to customization format entry points; and responsive to the retrieved customization format matching a customization entry points; and responsive to the retrieved customization format matching a customization entry point, reentering the retrieved customization format.

10. The method of claim 7, further comprising:

determining whether the retrieved customization format execution is complete; and responsive to completion of the execution of the retrieved customization format, requesting another customization format.

11. The method of claim 7, further comprising:
  detecting errors within the retrieved customization format;
  determining if an error handling logic exists within the data processing system; and
  responsive to error handling logic existing within the data processing system, activating the error handling logic.

12. A method in a data processing system for customizing a graphical user interface of a host application on a data processing system, the method comprising:
  establishing a plurality of customization format entry points;
  matching a current screen within the host application to a first customization format entry point from the plurality of customization entry points; and
  responsive to matching a current screen within the host application to a first customization format entry point from the plurality of customization entry points, executing the first customization format based on the matching.

13. The method of claim 12, further comprising:
  responsive to not matching a current screen within the host application to a first customization format entry point from the plurality of customization entity points, processing the current screen based on user customization input.

14. The method of claim 12, further comprising:
  responsive to not matching a current screen within the host application to a first customization format entry point from the plurality of customization entry points, processing the current screen based on default criteria.

15. A system in a data processing system for customizing a web-based graphical user interface for an application on a data processing system, wherein the application generates a plurality of screens of display and wherein the plurality of screens of display of the application are not web-based, comprising:
  initiating means for initiating customization of the web-based graphical user interface using a first customization format based on the plurality of screens of display; and
  switching means, responsive to a given event during customization, for automatically switching from the first customization format to a second customization format,
  wherein the first customization format and the second customization format maintain continuous interaction with the application.

16. The system of claim 15, wherein the first customization format is a macro-based customization format.

17. The system of claim 16, wherein initiating customization of the graphical user interface is sent to a predefined markup.

18. The system of claim 15, wherein the second customization format is a screen by screen customization format.

19. The system of claim 15, further comprising:
  displaying means, responsive to completion of customization of the graphical user interface, for displaying the graphical user interface based on the customization.

20. The system of claim 15, wherein if a first format and a second format cannot be determined, initiating customization of the graphical user interface by automatically switching to a default customization format.

21. A system in a data processing system for customizing a graphical user interface of a host application, comprising a plurality of screens, on a data processing system, comprising:
  retrieving means for a retrieving a customization format from a plurality of customization formats;
  determining means for determining if the retrieved customization format recognizes a host application screen among the plurality of host application screens; and
  executing means, responsive to the retrieved customization format recognizing the host application screen, for executing the retrieved customization format to customize the graphical user interface.

22. The system of claim 21, wherein the customization format is at least one of a macro-based customization format and a screen by screen customization format.

23. The system of claim 21, further comprising:
  exiting means, responsive to the retrieved customization format not recognizing the host application screen, for exiting the retrieved customization format;
  matching means for matching the retrieved customization format to customization format entry points; and
  reentering means, responsive to the retrieved customization format matching a customization entry point, for reentering the retrieved customization format.

24. The system of claim 21, further comprising:
  determining means for determining whether the retrieved customization format execution is complete; and
  requesting means, responsive to completion of the execution of the retrieved customization format.

25. The method of claim 21, further comprising:
  detecting means for detecting errors within the retrieved customization format;
  determining means for determining if an error handling logic exists within the data processing system; and
  activating means, responsive to error handling logic existing within the data processing system, for activating the error handling logic.

26. A system in a data processing system for customizing a graphical user interface of a host application on a data processing system, comprising:
  establishing means for establishing a plurality of customization format entry points;
  matching means for matching a current screen within the host application to a first customization format entry point from the plurality of customization entry points; and
  executing means, responsive to matching a current screen within the host application to a first customization format entry point from the plurality of customization entry points, for executing the first customization format based on the matching.

27. The system of claim 26, further comprising:
  processing means, responsive to not matching a current screen within the host application to a first customization format entry point from the plurality of customization entry points, for processing the current screen based on user customization input.

28. The method of claim 26, further comprising:
  processing means, responsive to not matching a current screen within the host application to a first customization format entry point from the plurality of customization entry points, for processing the current screen based on default criteria.

29. A computer program product in a computer-readable medium for use in a data processing system for customizing a web-based graphical user interface for an application on a data processing system, wherein the application generates a plurality of screens of display and wherein the plurality of screens of display of the application are not web-based, comprising:

instructions for initiating customization of the web-based graphical user interface using a first customization format based on the plurality of screens of display; and instructions, responsive to a given event during customization for automatically switching from the first customization format to a second customization format, wherein the first customization format and the second customization format maintain continuous interaction with the application.

30. The computer program product of claim 29, wherein the first customization format is a macro-based customization format.

31. The computer program product of claim 29, wherein the second customization format is a screen by screen customization format.

32. The computer program product of claim 29, further comprising:

instructions for, responsive to completion of customization of the graphical user interface, displaying the graphical user interface based on the customization.

33. A computer program product in a computer-readable medium for use in a data processing system for customizing a graphical user interface of a host application, comprising a plurality of screens, on a data processing system, comprising:

instructions for retrieving a customization format from a plurality of customization formats;

instructions for determining if the retrieved customization format recognizes a host application screen among the plurality of host application screens; and instructions for, responsive to the retrieved customization format recognizing the host application screen, executing the retrieved customization format to customize the graphical user interface.

34. The computer program product of claim 33, wherein the customization format is at least one of a macro-based customization format and a screen by screen customization format.

35. A computer program product in a computer-readable medium for customizing a graphical user interface of a host application on a data processing system, comprising:

instructions for establishing a plurality of customization format entry points;

instructions for matching a current screen within the host application to a first customization format entry point from the plurality of customization entry points; and instructions for, responsive to matching a current screen within the host application to a first customization format entry point from the plurality of customization entry points, executing the first customization format based on the matching.

* * * * *

UNITED STATES PATENT AND TRADEMARK OFFICE
CERTIFICATE OF CORRECTION

PATENT NO. : 6,915,486 B2
DATED : July 5, 2005
INVENTOR(S) : Li et al.

It is certified that error appears in the above-identified patent and that said Letters Patent is hereby corrected as shown below:

Column 11,
Line 24, after "customization" delete "entity" and insert -- entry --.

Column 12,
Line 55, after "28. The" delete "method" and insert -- system --.

Signed and Sealed this

Fourteenth Day of February, 2006

JON W. DUDAS
*Director of the United States Patent and Trademark Office*